H. T. MURPHY.
SIGNALING DEVICE FOR AUTOMOBILES.
APPLICATION FILED DEC. 20, 1915.
1,211,213.  Patented Jan. 2, 1917.
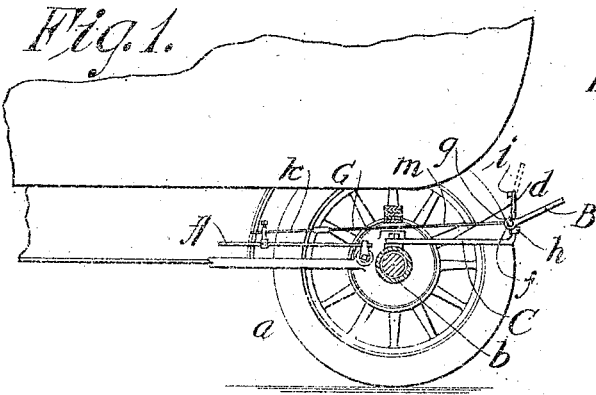
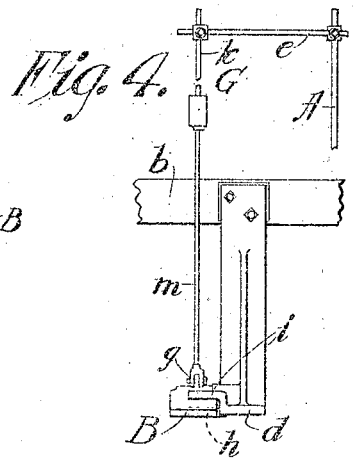
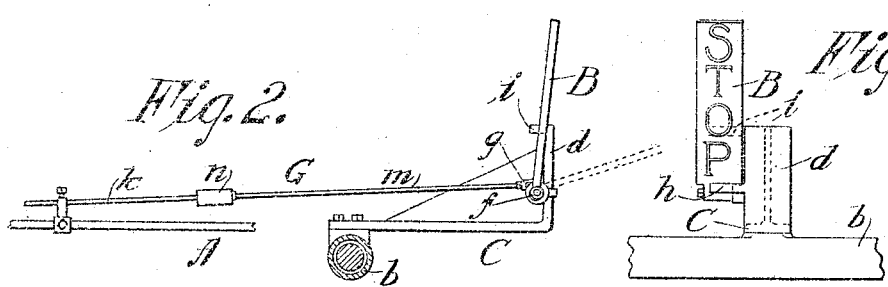
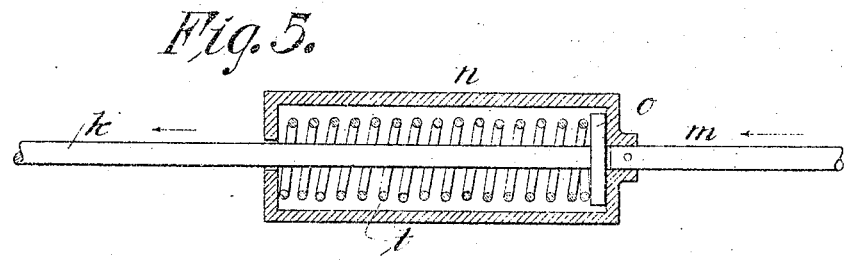
WITNESSES:
INVENTOR,
Harold T. Murphy,
BY
ATTORNEY.

UNITED STATES PATENT OFFICE.

HAROLD T. MURPHY, OF SPRINGFIELD, MASSACHUSETTS.

SIGNALING DEVICE FOR AUTOMOBILES.

1,211,213.　　　　　Specification of Letters Patent.　　　Patented Jan. 2, 1917.

Application filed December 20, 1915. Serial No. 67,803.

*To all whom it may concern:*

Be it known that I, HAROLD T. MURPHY, a citizen of the United States of America, and resident of Springfield, in the county of Hampden and State of Massachusetts, have invented certain new and useful Improvements in Signaling Devices for Automobiles, of which the following is a full, clear, and exact description.

The object of this invention is to provide signal at the rear of the frame of an automobile, which is operative in conjunction with the brake operating rod, to set a signal so as to indicate, preparatory to the setting of the brake for slowing up or stopping the car that such slowing or stopping is to transpire, whereby the driver of a vehicle behind may govern himself accordingly.

Another object of the invention is to provide the signal and operating means therefor of such simple, practical, and inexpensive construction as to render it acceptable and desirable to makers and users of automobiles.

The invention is described in conjunction with the accompanying drawings and is set forth in the claim.

In the drawings: Figure 1 shows a side elevation of the rear portion of an automobile having the present improved signaling device mounted thereon. Fig. 2 is a sectional elevation on a larger scale for more clearly showing the signaling device. Fig. 3 is a rear elevation of Fig. 2. Fig. 4 is a plan view of the same parts shown in Fig. 2, and Fig. 5 is a sectional elevation showing a two part construction and provisions for lost motion of the parts comprised in the signal operating rod.

In the drawings, A represents the rod for operating the band brake on one of the rear wheels $a$ of the automobile, such brake being operable, as usual, on the forward draft thereof to set the brake and to release the brake when reversely moved.

B represents the signal member which is adapted to be swung from an approximately horizontal position almost but not quite to a vertical position for showing, when in the latter position, the word "Stop" thereon or other appropriate legend or symbol for notification to the driver of a vehicle behind that the automobile having the signal is about to slow down or stop.

The signal member is carried on a bracket C secured on any suitable rear portion of the automobile on which it may appropriately be mounted without partaking of the vertical vibration of the spring supported body; as shown the bracket is carried on the tubular housing $b$ of the rear wheel axle. This bracket horizontally rearwardly extended is provided with an upstanding member $d$ to a lower portion of which the signal member is connected by a pivot $f$, the length of which is parallel with the rear wheel axle and the housing $b$ therefor.

G represents a rod ranging substantially parallel with the brake rod A, and connected thereto through the medium of a rigid rod or bar $e$, such rod G being rearwardly extended to connection with the signal member B at a point $g$ slightly above the pivot $f$, so that under the forward draft of the brake rod for the tightening of the brake band, the signal member will be swung from its approximately horizontal to its nearly vertical position, that is from the position shown in Fig. 1 to that shown in Figs. 2 and 3, for displaying the warning to another at the rear of the machine.

The bracket is provided with a stop $h$ on which the signal member may rest while in its normal position, and the upstanding member thereof is provided with another abutment shoulder or stop $i$ against which the signal when swung to the position which is nearly vertical, but nevertheless upwardly and rearwardly inclined, may be brought to limiting abutment.

Inasmuch as the amount of draft motion on the signal operating rod G is comparatively slight, owing to the proximity of the pivot $g$ to the pivot $f$, as necessary to insure the throwing up of the signal, such motion being less than the usual movement required of the brake rod for the tight setting of the brake, I construct the signal operating rod in two sections, $k$ and $m$, providing on the section $m$,—which is directly connected to the signal member,—a yoke $n$ which embraces the head or enlargement C on the end of the section $k$, which is directly connected to the brake operating rod, and which yoke loosely encircles the rod section $k$ at a point considerably removed from the said head $o$; and interposed between the head $o$ of the rod section $k$ and the end of the yoke $m$ opposite from that of its connection with the rod section $m$, a spiral spring $t$ is interposed.

When the brake rod is moved in the brake setting direction and with it the rod section *k* and its head *o*, the rod section *m* is correspondingly drawn, without the spring becoming compressed, and the signal is thrown up to its effective position. This will occur considerably before the brake becomes tightened to retard or stop the automobile; and in the further continued draft movement of the brake operating rod it is effective, after the signal has been thrown up, to cause, without draft movement on the rod section *m*, an independent draft movement on the rod section *k*, as permitted by the compression of the spring *t* in the yoke *n*.

When the brake is released and the signal operating rod reversely moved, the parts will automatically resume their normal conditions, the spring *t* being effective to return the rod sections to their normal positions, and the signal, owing to its inclination will freely swing downwardly to its approximately horizontal position.

By having the signal when thrown up limited to the inclined position shown and referred to, its return to normal position is not in any way obstructed by the parts being on a dead center, but on the other hand its movement is facilitated by gravitative action.

The components of the present device,— the signal member, the integrally formed bracket and the signal operating rod made for connection with the brake operating rod as described, are so few and simple as to render the device desirable and worthy as an equipment on an automobile, and the action thereof, as appreciated, being entirely automatic in conjunction with the operation of the brake, leaves no act or heed on the part of the driver of the machine necessary; and, moreover, the cost of the appliance is comparatively small.

I claim:—

In a signaling device, in combination with the rear axle housing of an automobile, a bracket supported on said housing, extended rearwardly therefrom and provided with an upstanding member, a signaling member which at its lower end is pivotally connected to said upstanding member on an axis parallel with that of the rear axle of the vehicle, a brake operating rod, and a rod connected with and ranging substantially parallel with the brake operating rod and rearwardly extended to connection with said signaling member at a point slightly above the point of pivotal connection of said signaling member with said support, a stop on the upstanding member of said bracket on which the signal member rests normally in an approximately horizontal position, another stop provided at an upper part of the said upstanding member for limiting the signal member in an upwardly and rearwardly inclined position, and said second mentioned rod comprising separately formed sections having a spring retracting lost motion connection.

Signed by me at Springfield, Mass., in presence of two subscribing witnesses.

HAROLD T. MURPHY.

Witnesses:
G. R. DRISCOLL,
WM. S. BELLOWS.